(12) United States Patent
Yamazaki et al.

(10) Patent No.: US 11,291,230 B2
(45) Date of Patent: Apr. 5, 2022

(54) PERFUME COMPOSITION, FOOD AND BEVERAGE, AND METHOD FOR PRODUCING FOOD AND BEVERAGE

(71) Applicant: TAKASAGO INTERNATIONAL CORPORATION, Tokyo (JP)

(72) Inventors: Yuichiro Yamazaki, Kanagawa (JP); Shingo Chiba, Kanagawa (JP); Akihiro Kawaraya, Kanagawa (JP)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 183 days.

(21) Appl. No.: 16/325,476

(22) PCT Filed: Aug. 22, 2017

(86) PCT No.: PCT/JP2017/029894
§ 371 (c)(1),
(2) Date: Feb. 14, 2019

(87) PCT Pub. No.: WO2018/038089
PCT Pub. Date: Mar. 1, 2018

(65) Prior Publication Data
US 2019/0174805 A1 Jun. 13, 2019

(30) Foreign Application Priority Data

Aug. 22, 2016 (JP) .............................. JP2016-162071

(51) Int. Cl.
| | | |
|---|---|---|
| A23L 27/10 | (2016.01) | |
| A23L 2/02 | (2006.01) | |
| A23L 27/20 | (2016.01) | |
| C11B 9/00 | (2006.01) | |
| A23L 2/56 | (2006.01) | |

(52) U.S. Cl.
CPC .............. *A23L 27/10* (2016.08); *A23L 2/02* (2013.01); *A23L 2/56* (2013.01); *A23L 27/20* (2016.08); *C11B 9/00* (2013.01); *A23V 2002/00* (2013.01); *A23V 2200/15* (2013.01); *A23V 2250/21* (2013.01)

(58) Field of Classification Search
CPC . A23L 27/10; A23L 27/20; A23L 2/02; A23L 2/56; C11B 9/00
See application file for complete search history.

(56) References Cited

U.S. PATENT DOCUMENTS

2013/0101724 A1  4/2013  Kawamoto et al.

FOREIGN PATENT DOCUMENTS

| | | | |
|---|---|---|---|
| CN | 1133136 | A | 10/1996 |
| CN | 1672586 | A * | 9/2005 |
| CN | 1672586 | A | 9/2005 |
| CN | 102905559 | A | 1/2013 |
| CN | 103766832 | A | 5/2014 |
| CN | 103783600 | A | 5/2014 |
| CN | 104187524 | A | 12/2014 |
| CN | 104286788 | A | 1/2015 |
| CN | 103504306 | B | 4/2016 |
| CN | 105639578 | A | 6/2016 |
| JP | 8-140640 | A | 6/1996 |
| JP | 8-310931 | A | 11/1996 |
| JP | 11-155480 | A | 6/1999 |
| JP | 2015-12847 | A | 1/2015 |

OTHER PUBLICATIONS

CN 1672586 A English Translation. (Year: 2005).*
Lee et al., "Protective effect of Cyperi rhizome against 6-hydroxydopamine-induced neuronal damage", J Med Food, Jun. 2010; 13(3 ): 564-71, Retrieved from Internet: https://pubmed.ncbi.nlm.nih.gov/20521982/. (Year: 2010).*
Communication dated Dec. 13, 2019 by the Singapore Patent Office in counterpart Application No. 11201901350R.
Alex Atala "A new ingredient: The introduction of priprioca in gastronomy" International Journal of Gastronomy and Food Science, Dec. 3, 2011, vol. 1, No. 1, (pp. 61-63).
Mohamed A. Gamal et al. "A Review: Compounds Isolated from Cyperus Species (Part II) Terpenoidal" International Journal of Pharmacognosy and Phytochemical Research, Feb. 1, 2015, vol. 7, vol. 1 (pp. 83-99).
Maria das Gragas B. Zoghbi et al. Yield and Chemical Composition of the Essential Oil of the Stems and Rhizomes of *Cyperus articulatus* L. Cultivated in the State of Para', Brazil Journal of Essential Oil Research, Feb. 28, 2006, vol. 18, No. 1, (pp. 10-12), 4 pages total.
Kapadia, et al., "Structure of Muskatone and Capone", 1963, Tetrahedron Letters, vol. 28, pp. 1933-1939.
Niebler, et al., "Fragrant Sesquiterpene Ketones as Trace Constituents in Frankincense Volatile Oil of Boswellia sacra", 2016, Journal of Natural Products, Vo. 79, 5 pages total.
Clery, et al., "Constituents of Cypriol Oil (*Cyperus scariosus* R.Br.): N-Containing Molecules and Key Aroma Components", 2016, Journal of Agricultural and Food Chemistry, vol. 64, pp. 4566-4573.
Kokkalou, E., "The Constituents of the Essential Oil from Lavandula stoechas Growing Wild in Greece", 1988, Planta Medica, vol. 54(1), pp. 58-59.
Anonymous, "Dai 60 Kai TEAC de Best Presentation-sho o Jusho shimashita", 2016, Takasago Perfumery Co., Ltd., 2 pages total, http://www.takasago.com/ja/rd/2016/1130_1153.html.
Search Report dated Nov. 14, 2017, issued by the International Searching Authority in counterpart Internal Patent Application No. PCT/JP2017/029894 (PCT/ISA/210).
Written Opinion dated Nov. 14, 2017, issued by the International Searching Authority in counterpart Internal Patent Application No. PCT/JP2017/029894 (PCT/ISA/237).
Gkinis et al., "Evaluation of the repellent effects of Nepeta parnassica extract, essential oil, and its major nepetalactone metabolite against mosquitoes", Parasitology Research, vol. 113, Jan. 22, 2014, pp. 1127-1134, XP035355613.

(Continued)

*Primary Examiner* — Stephanie A Cox
(74) *Attorney, Agent, or Firm* — Sughrue Mion, PLLC

(57) ABSTRACT

A flavor composition to be added to a food or drink, which composition contains at least one selected from the group consisting of (−)-mustakone, (+)-mustakone, and a mixture thereof, the drink may be a citrus drink including a citrus, and the citrus may be at least one selected from the group consisting of grapefruit, orange, and lemon.

10 Claims, No Drawings

(56) References Cited

OTHER PUBLICATIONS

Lyege Amazonas Maciel Magalhães et al., "Chemical Composition and Larvicidal Activity against Aedes aegypti Larvae of Essential Oils from Four *Guarea* Species", Molecules, vol. 15, Aug. 19, 2010, pp. 5734-5741, XP55313106.
Arslan Masood Pirzada et al., "*Cyperus rotundus* L.: Traditional uses, phytochemistry, and pharmacological activities", Journal of Ethnopharmacology, vol. 174, Aug. 20, 2015, pp. 549-560, XP029296544.
Communication dated Mar. 3, 2020 issued by the European Intellectual Property Office in European Application No. 17843569.9.
Communication dated Oct. 12, 2020, from the Intellectual Property Office of the Philippines in counterpart application No. 1/2019/500290.
Office Action dated Dec. 8, 2020, issued by the Indonesian Patent Office in the corresponding Indonesian patent application No. PID201901518.
Draft Uganda Standard, Second Edition, Fruit juice drinks— Specification, Reference No. DUS 62:2010, Dec. 31, 2010, 16 pages total.
Communication dated Feb. 5, 2021, from the Intellectual Property Office of Singapore in Application No. 11201901350R.
Office Action dated Jun. 29, 2021 by the Japanese Patent Office in corresponding Japanese Patent Application No. 2018-535688.
Office Action dated Oct. 8, 2021 by the Korean Intellectual Property Office in Korean Patent Application No. 10-2019-7004740.

\* cited by examiner

PERFUME COMPOSITION, FOOD AND BEVERAGE, AND METHOD FOR PRODUCING FOOD AND BEVERAGE

TECHNICAL FIELD

The present invention relates to a flavor composition containing mustakone as an active ingredient, which is capable of imparting or enhancing a juicy sensation or fleshy sensation with high natural feeling, or a ripened sensation, a food or drink, and a method for producing a food or drink.

BACKGROUND ART

Mustakone is a compound which was isolated from an essential oil of *Cyperus rotundus* L. (family cyperaceae) and the structure was determined, by Kapadia, et al. in 1963 (see Non-Patent Literature 1). There is almost no report regarding its flavor. In 2016, Neibler, et al. reported mustakone as a spicy, woody, slightly fatty, meat broth-like, or balsamic flavor component in the volatile component analysis of frankincense (see Non-Patent Literature 2); and in 2016, Clery, et al. reported mustakone as a spicy, a carrot-like, or woody flavor component in the component analysis of cypriol oil (*Cyperus scariosus* R.Br.) (see Non-Patent Literature 3). However, neither specific contribution nor effect on the entire flavor is known.

CITATION LIST

Non-Patent Literature

Non-Patent Literature 1: Tetrahedron Letters (1963), 28, 1933-1939
Non-Patent Literature 2: Journal of Natural Products (2016), 79, 1160-1164
Non-Patent Literature 3: Journal of Agricultural and Food Chemistry (2016), 64, 4566-4573

SUMMARY OF INVENTION

Technical Problem

A problem of the present invention is to provide a flavorcomposition to be added to a food or drink, which is capable of imparting or enhancing a fleshy sensation or a juicy sensation, or a flavor of ripened sensation; and to provide a food or drink in which a fleshy sensation or a juicy sensation, or a flavor of ripened sensation is imparted or enhanced by using the same.

Solution to Problem

In order to solve the foregoing problem, the present inventors made extensive and intensive investigations. As a result, it has been found that by using mustakone which has not been utilized as a flavor component for a food or drink, the flavor of a fleshy sensation or a juicy sensation, or the flavor of ripened sensation can be imparted or enhanced, thereby leading to accomplishment of the present invention.

Specifically, the present invention includes the following contents [1] to [10].

[1] A flavor composition to be added to a food or drink, the composition containing at least one selected from the group consisting of (−)-mustakone, (+)-mustakone, and a mixture thereof.

[2] The flavor composition according to [1], wherein the food or drink is a drink.
[3] The flavor composition according to [2], wherein the drink is a citrus drink including a citrus.
[4] The flavor composition according to [3], wherein the citrus is at least one selected from the group consisting of grapefruit, orange, and lemon.
[5] A food or drink including the flavor composition according to any one of [1] to [4].
[6] A method for producing a food or drink, including adding the flavor composition according to any one of [1] to [4].
[7] A food or drink containing at least one selected from (−)-mustakone, (+)-mustakone, and a mixture thereof.
[8] The food or drink according to [7], wherein the food or drink is a citrus-like food or drink.
[9] A method for producing a food or drink, including adding at least one selected from (−)-mustakone, (+)-mustakone, and a mixture thereof.
[10] The method for producing a food or drink according to [9], wherein the food or drink is a citrus-like food or drink.

Advantageous Effects of Invention

In accordance with the present invention, a flavor composition to be added to a food or drink, which is capable of imparting or enhancing a fleshy sensation or a juicy sensation, or a flavor of ripened sensation; and a food or drink in which a fleshy sensation or a juicy sensation, or a flavor of ripened sensation is imparted or enhanced can be provided.

DESCRIPTION OF EMBODIMENTS

The present invention is hereunder described in detail.
The flavor composition to be added to a food or drink according to the present invention (hereinafter also referred to simply as "flavor composition of the present invention") contains at least one selected from (−)-mustakone, (+)-mustakone, and a mixture thereof.

In the mustakone, there are two optical isomers, and (+)-mustakone and (−)-mustakone are included.

[Chem. 1]

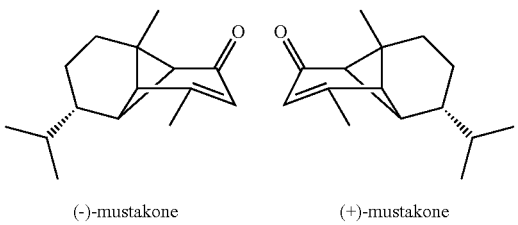

(−)-mustakone      (+)-mustakone

In the present invention, all of (±)-mustakone which is a racemate, (+)-mustakone, (−)-mustakone, and mustakone in which (+)-mustakone and (−)-mustakone are contained in an arbitrary ratio (hereinafter referred to simply as "mustakone") can be used. As for the mustakone, one obtained through purification from a natural product, such as an essential oil of *Cyperus rotundus* L. and cypriol oil, may be used, and one obtained through chemical synthesis from α-copaene, etc. (for example, one obtained by a method described in Tetrahedron (1965), 21, 607-618) may also be used. Alternatively, one obtained from a natural product and one obtained through chemical synthesis may be used in combination.

As for the α-copaene which is a starting raw material of the chemical synthesis, (−)-α-copaene and (+)-α-copaene can be readily purified from gurjun balsam oil and angelica seed oil, respectively through normal-phase and reverse-phase column chromatography. When (−)-α-copaene is used as the starting raw material, (−)-mustakone can be obtained, and when (+)-α-copaene is used as the starting raw material, (+)-mustakone can be obtained.

By blending a food or drink with infinitesimal amounts of the flavor composition of the present invention and mustakone directly, a fleshy sensation or a juicy sensation, or a ripened sensation can be imparted or enhanced. By using the flavor composition and mustakone mixed with other component, a fleshy sensation or a juicy sensation, or a ripened sensation can also be imparted or enhanced in a food or drink. As the other flavor component which may be mixed, there may be mentioned various synthetic flavors, natural flavors or fragrances, natural essential oils, plant extracts or the like. For example, there may be mentioned natural essential oils, natural flavors or fragrances, synthetic flavors or fragrances, and so on, as described in "Japan Patent Office Gazette, Known Customary Technologies (Flavor or Fragrance), Part II, Food Flavor, published on Jan. 14, 2000, pp. 88-131".

Though the content of mustakone in the flavor composition of the present invention varies with the other flavor component to be mixed and cannot be unequivocally defined, it can be set to a concentration range of typically from 0.000001 to 10,000 ppm, preferably from 0.0001 to 1,000 ppm, and more preferably from 0.001 to 100 ppm on a basis of the weight of the flavor composition to be added to a food or drink. When the content of mustakone is less than 0.000001 ppm, the flavor imparting effect is not obtained, whereas when the content is more than 10,000 ppm, a woody note becomes excessively strong, and hence, such is not preferred.

In the case of adding mustakone to the food or drink in order to impart or enhance a fleshy sensation or a juicy sensation, or a ripened sensation, its content can be set to a concentration range of from 0.000001 to 10,000 ppb, preferably from 0.0001 to 1,000 ppb, and more preferably from 0.001 to 100 ppb relative to the weight of the food or drink. When the content of mustakone is less than 0.000001 ppb relative to the weight of the food or drink, the flavor imparting effect is not obtained, whereas when the content is more than 10,000 ppb, a woody note becomes excessively strong, and hence, such is not preferred.

In the flavor composition containing mustakone according to the present invention, for example, solvents, such as water and ethanol; and fixatives, such as ethylene glycol, propylene glycol, dipropylene glycol, glycerin, hexyl glycol, benzyl benzoate, triethyl citrate, diethyl phthalate, Hercolyn, a medium chain fatty acid triglyceride, and a medium chain fatty acid diglyceride, all of which are usually used, can be contained, as necessary.

By the addition of the flavor composition of the present invention and mustakone themselves, a fleshy sensation or a juicy sensation, or a flavor of ripened sensation of the food or drink can be imparted or enhanced.

Specific examples of the food or drink in which a fleshy sensation or a juicy sensation, or a flavor of ripened sensation can be imparted or enhanced, include drinks, such as a carbonated drink, a soft drink, a fruit juice drink, a fruit liquor, a milk-based drink, a lactic acid bacteria fermented drink, a health drink, a soybean milk, and a tea drink; desserts, such as an ice cream, an ice milk, a lacto ice, a sherbet, a yoghurt, a pudding, a jelly, and a daily dessert; confectioneries, such as a caramel, a candy, a tablet candy, a cracker, a biscuit, a cookie, a pie, a chocolate, a snack food, a chewing gum, a bun with a bean-jam filling, and an azuki-bean jelly; soups, such as a Japanese-style soup, a western-style soup, and a Chinese soup; breads; jams; flavor seasonings; various instant drinks; various instant foods; and so on.

Among the aforementioned foods, the citrus-like foods or drinks are preferably used in the present invention.

The aforementioned drink is preferably a citrus-like drink including a citrus.

Specific examples of the citrus, include grapefruit, orange, lemon and the like.

Though the addition amount of the flavor composition of the present invention to the food or drink varies depending on the kind or form of the product, it can be set to typically 0.1% by weight, and preferably a concentration range of from 0.01 to 5% by weight on a basis of the weight of the food or drink. When the content of the flavor composition of the present invention is less than 0.01% by weight, the effect of imparting or enhancing citrus-like flavor is not obtained, whereas when the content is more than 5% by weight, an unpleasant odor becomes strong, and hence, such is not preferred.

EXAMPLES

The present invention is hereunder more specifically described by reference to Examples, but it should be construed that the present invention is not limited to these Examples.

Reference Example

Production of (−)-Mustakone and (+)-Mustakone (a) Production of (−)-Mustakone 5 g of gurjun balsam oil was purified by means of normal-phase medium-pressure preparative chromatography (eluting solution: hexane), to obtain 1.5 g of (−)-α-copaene, and then (−)-mustakone was obtained in conformity with a method described in the literature (Tetrahedron (1965), 21, 607-618).

(b) Production of (+)-Mustakone 168 g of a hydrocarbon fraction was obtained from 200 g of angelica seed oil by means of silica gel column chromatography. 100 g of the resulting fraction was used and purified by means of reverse-phase medium-pressure preparative chromatography (eluting solution: water and acetonitrile), to obtain 0.2 g of (+)-α-copaene, and then (+)-mustakone was obtained in conformity with a method described in the aforementioned literature.

(c) Preparation of (±)-Mustakone

Equal amounts of the (−)-form and (+)-form obtained in the above (a) and (b) were mixed to prepare (±)-mustakone.

Example 1

Flavor Composition for Grapefruit Food

Flavor compositions (A-1), (A-2), and (A-3) for grapefruit food were prepared according to the following formulations.

TABLE 1

Formulation of Flavor Composition (A-1)

| (Component) | (Parts by weight) |
|---|---|
| (±)-Mustakone | 0.005 |
| Grapefruit oil (cold pressed) | 50.0 |
| Ethanol | Balance |
| Total | 1,000.0 |

TABLE 2

Formulation of Flavor Composition (A-2)

| (Component) | (Parts by weight) |
|---|---|
| (−)-Mustakone | 0.005 |
| Grapefruit oil (cold pressed) | 50.0 |
| Ethanol | Balance |
| Total | 1,000.0 |

TABLE 3

Formulation of Flavor Composition (A-3)

| (Component) | (Parts by weight) |
|---|---|
| (+)-Mustakone | 0.005 |
| Grapefruit oil (cold pressed) | 50.0 |
| Ethanol | Balance |
| Total | 1,000.0 |

Comparative Example 1

As Comparative Example 1, a flavor composition (B) for grapefruit food was prepared according to the following formulation.

TABLE 4

Formulation of Flavor Composition (B)

| (Component) | (Parts by weight) |
|---|---|
| Grapefruit oil (cold pressed) | 50.0 |
| Ethanol | Balance |
| Total | 1,000.0 |

Comparison Test Example 1

0.1% by weight of each of the flavor compositions (A-1), (A-2), (A-3), and (B) for grapefruit food obtained in Example 1 and Comparative Example 1 was added to water, and an organoleptic test by five expert panelists was performed. As a result, all the members pointed out that the waters having the flavor compositions (A-1), (A-2), and (A-3) of Example 1, respectively added thereto were imparted with a natural and fresh juicy sensation and were remarkably excellent as compared with the water having the flavor composition (B) of Comparative Example 1 added thereto.

Example 2

Addition to Commercial Grapefruit Fruit Juice Drink 5 ppb of (±)-mustakone was added to a commercial grapefruit fruit juice drink, and an organoleptic test by five expert panelists was performed. As a result, all the members pointed out that by adding (±)-mustakone, the resultant was imparted with a natural juicy sensation rich in voluminousness and was remarkably excellent.

Example 3

Addition to Commercial Grapefruit Fruit Juice Drink 5 ppb of (−)-mustakone was added to a commercial grapefruit fruit juice drink, and an organoleptic test by five expert panelists was performed. As a result, all the members pointed out that by adding (−)-mustakone, the resultant was imparted with a natural juicy sensation rich in voluminousness and was remarkably excellent.

Example 4

Addition to Commercial Grapefruit Fruit Juice Drink 5 ppb of (+)-mustakone was added to a commercial grapefruit fruit juice drink, and an organoleptic test by five expert panelists was performed. As a result, all the members pointed out that by adding (+)-mustakone, the resultant was imparted with a natural juicy sensation rich in voluminousness and was remarkably excellent.

Example 5

Flavor Composition for Grapefruit Food

Flavor compositions (C-1), (C-2), and (C-3) for grapefruit food were prepared according to the following formulations.

TABLE 5

Formulation of Flavor Composition (C-1)

| (Component) | (Parts by weight) |
|---|---|
| (±)-Mustakone | 0.005 |
| Nootkatone | 2.0 |
| Octanal | 0.3 |
| Decanal | 0.2 |
| Dodecanal | 0.1 |
| Linalool | 0.8 |
| cis-3-Hexenol | 0.5 |
| Ethanol | Balance |
| Total | 1,000.0 |

TABLE 6

Formulation of Flavor Composition (C-2)

| (Component) | (Parts by weight) |
|---|---|
| (−)-Mustakone | 0.005 |
| Nootkatone | 2.0 |
| Octanal | 0.3 |

TABLE 6-continued

Formulation of Flavor Composition (C-2)

| (Component) | (Parts by weight) |
|---|---|
| Decanal | 0.2 |
| Dodecanal | 0.1 |
| Linalool | 0.8 |
| cis-3-Hexenol | 0.5 |
| Ethanol | Balance |
| Total | 1,000.0 |

TABLE 7

Formulation of Flavor Composition (C-3)

| (Component) | (Parts by weight) |
|---|---|
| (+)-Mustakone | 0.005 |
| Nootkatone | 2.0 |
| Octanal | 0.3 |
| Decanal | 0.2 |
| Dodecanal | 0.1 |
| Linalool | 0.8 |
| cis-3-Hexenol | 0.5 |
| Ethanol | Balance |
| Total | 1,000.0 |

Comparative Example 2

As Comparative Example 2, a flavor composition (D) for grapefruit food was prepared according to the following formulation.

TABLE 8

Formulation of Flavor Composition (D)

| (Component) | (Parts by weight) |
|---|---|
| Nootkatone | 2.0 |
| Octanal | 0.3 |
| Decanal | 0.2 |
| Dodecanal | 0.1 |
| Linalool | 0.8 |
| cis-3-Hexenol | 0.5 |
| Ethanol | Balance |
| Total | 1,000.0 |

Comparison Test Example 2

0.1% by weight of each of the flavor compositions (C-1), (C-2), (C-3), and (D) for grapefruit food obtained in Example 5 and Comparative Example 2 was added to water, and an organoleptic test by five expert panelists was performed. As a result, all the members pointed out that the waters having the flavor compositions (C-1), (C-2), and (C-3) of Example 5, respectively added thereto were imparted with a natural and thick juicy sensation which was not felt in the water having the flavor composition (D) of Comparative Example 2, and were remarkably excellent.

Example 6

Flavor Composition for Orange Food

Flavor compositions (E-1), (E-2), and (E-3) for orange food were prepared according to the following formulations.

TABLE 9

Formulation of Flavor Composition (E-1)

| (Component) | (Parts by weight) |
|---|---|
| (±)-Mustakone | 0.005 |
| Orange oil (cold pressed) | 50.0 |
| Ethanol | Balance |
| Total | 1,000.0 |

TABLE 10

Formulation of Flavor Composition (E-2)

| (Component) | (Parts by weight) |
|---|---|
| (−)-Mustakone | 0.005 |
| Orange oil (cold pressed) | 50.0 |
| Ethanol | Balance |
| Total | 1,000.0 |

TABLE 11

Formulation of Flavor Composition (E-3)

| (Component) | (Parts by weight) |
|---|---|
| (+)-Mustakone | 0.005 |
| Orange oil (cold pressed) | 50.0 |
| Ethanol | Balance |
| Total | 1,000.0 |

Comparative Example 3

As Comparative Example 3, a flavor composition (F) for orange food was prepared according to the following formulation.

TABLE 12

Formulation of Flavor Composition (F)

| (Component) | (Parts by weight) |
|---|---|
| Orange oil (cold pressed) | 50.0 |
| Ethanol | Balance |
| Total | 1,000.0 |

Comparison Test Example 3

0.1% by weight of each of the flavor compositions (E-1), (E-2), (E-3), and (F) for orange food obtained in Example 6 and Comparative Example 3 was added to water, and an organoleptic test by five expert panelists was performed. As a result, all the members pointed out that the waters having the flavor compositions (E-1), (E-2), and (E-3) of Example 6, respectively added thereto were imparted with a natural and fresh juicy sensation and were remarkably excellent as compared with the water having the flavor composition (F) of Comparative Example 3 added thereto.

Example 7

Addition to Commercial Orange Fruit Juice Drink 5 ppb of (±)-mustakone was added to a commercial orange fruit juice drink, and an organoleptic test by five expert panelists was performed. As a result, all the members pointed out that by adding (±)-mustakone, the resultant was imparted with a natural juicy sensation rich in voluminousness and was remarkably excellent.

Example 8

Addition to Commercial Orange Fruit Juice Drink 5 ppb of (−)-mustakone was added to a commercial orange fruit juice drink, and an organoleptic test by five expert panelists was performed. As a result, all the members pointed out that by adding (−)-mustakone, the resultant was imparted with a natural juicy sensation rich in voluminousness and was remarkably excellent.

Example 9

Addition to Commercial Orange Fruit Juice Drink 5 ppb of (+)-mustakone was added to a commercial orange fruit juice drink, and an organoleptic test by five expert panelists was performed. As a result, all the members pointed out that by adding (+)-mustakone, the resultant was imparted with a natural juicy sensation rich in voluminousness and was remarkably excellent.

Example 10

Flavor Composition for Orange Food

Flavor compositions (G-1), (G-2), and (G-3) for orange food were prepared according to the following formulations.

TABLE 13

| Formulation of Flavor Composition (G-1) | |
| --- | --- |
| (Component) | (Parts by weight) |
| (±)-Mustakone | 0.005 |
| Ethyl acetate | 0.5 |
| Octanal | 1.0 |
| Nonanal | 0.1 |
| Decanal | 0.5 |
| Linalool | 2.0 |
| Ethanol | Balance |
| Total | 1,000.0 |

TABLE 14

| Formulation of Flavor Composition (G-2) | |
| --- | --- |
| (Component) | (Parts by weight) |
| (−)-Mustakone | 0.005 |
| Ethyl acetate | 0.5 |
| Octanal | 1.0 |
| Nonanal | 0.1 |
| Decanal | 0.5 |
| Linalool | 2.0 |
| Ethanol | Balance |
| Total | 1,000.0 |

TABLE 15

| Formulation of Flavor Composition (G-3) | |
| --- | --- |
| (Component) | (Parts by weight) |
| (+)-Mustakone | 0.005 |
| Ethyl acetate | 0.5 |
| Octanal | 1.0 |
| Nonanal | 0.1 |
| Decanal | 0.5 |
| Linalool | 2.0 |
| Ethanol | Balance |
| Total | 1,000.0 |

Comparative Example 4

As Comparative Example 4, a flavor composition (H) for orange food was prepared according to the following formulation.

TABLE 16

| Formulation of Flavor Composition (H) | |
| --- | --- |
| (Component) | (Parts by weight) |
| Ethyl acetate | 0.5 |
| Octanal | 1.0 |
| Nonanal | 0.1 |
| Decanal | 0.5 |
| Linalool | 2.0 |
| Ethanol | Balance |
| Total | 1,000.0 |

Comparison Test Example 4

0.1% by weight of each of the flavor compositions (G-1), (G-2), (G-3), and (H) for orange food obtained in Example 10 and Comparative Example 4 was added to water, and an organoleptic test by five expert panelists was performed. As a result, all the members pointed out that the waters having the flavor compositions (G-1), (G-2), and (G-3) of Example 10, respectively added thereto were imparted with a natural and profound juicy sensation which was not felt in the water having the flavor composition (H) of Comparative Example 4, and were remarkably excellent.

Example 11

Flavor Composition for Lemon Food

Flavor compositions (I-1), (I-2), and (I-3) for lemon food were prepared according to the following formulations.

TABLE 17

| Formulation of Flavor Composition (I-1) | |
| --- | --- |
| (Component) | (Parts by weight) |
| (±)-Mustakone | 0.005 |
| Lemon oil (cold pressed) | 50.0 |
| Ethanol | Balance |
| Total | 1,000.0 |

TABLE 18

| Formulation of Flavor Composition (I-2) | |
| --- | --- |
| (Component) | (Parts by weight) |
| (−)-Mustakone | 0.005 |
| Lemon oil (cold pressed) | 50.0 |
| Ethanol | Balance |
| Total | 1,000.0 |

TABLE 19

| Formulation of Flavor Composition (I-3) | |
| --- | --- |
| (Component) | (Parts by weight) |
| (+)-Mustakone | 0.005 |
| Lemon oil (cold pressed) | 50.0 |
| Ethanol | Balance |
| Total | 1,000.0 |

Comparative Example 5

As Comparative Example 5, a flavor composition (J) for lemon food was prepared according to the following formulation.

TABLE 20

| Formulation of Flavor Composition (J) | |
| --- | --- |
| (Component) | (Parts by weight) |
| Lemon oil (cold pressed) | 50.0 |
| Ethanol | Balance |
| Total | 1,000.0 |

Comparison Test Example 5

0.1% by weight of each of the flavor compositions (I-1), (I-2), (I-3), and (J) for lemon food obtained in Example 11 and Comparative Example 5 was added to water, and an organoleptic test by five expert panelists was performed. As a result, all the members pointed out that the waters having the flavor compositions (I-1), (I-2), and (I-3) of Example 11, respectively added thereto were imparted with a natural and fresh juicy sensation and were remarkably excellent as compared with the water having the flavor composition (J) of Comparative Example 5 added thereto.

Example 12

Addition to Commercial Lemon Fruit Juice Drink 5 ppb of (±)-mustakone was added to a commercial lemon fruit juice drink, and an organoleptic test by five expert panelists was performed. As a result, all the members pointed out that by adding (±)-mustakone, the resultant was imparted with a natural juicy sensation rich in voluminousness and was remarkably excellent.

Example 13

Addition to Commercial Lemon Fruit Juice Drink 5 ppb of (−)-mustakone was added to a commercial lemon fruit juice drink, and an organoleptic test by five expert panelists was performed. As a result, all the members pointed out that by adding (−)-mustakone, the resultant was imparted with a natural juicy sensation rich in voluminousness and was remarkably excellent.

Example 14

Addition to Commercial Lemon Fruit Juice Drink 5 ppb of (+)-mustakone was added to a commercial lemon fruit juice drink, and an organoleptic test by five expert panelists was performed. As a result, all the members pointed out that by adding (+)-mustakone, the resultant was imparted with a natural juicy sensation rich in voluminousness and was remarkably excellent.

Example 15

Flavor Composition for Lemon Food

Flavor compositions (K-1), (K-2), and (K-3) for lemon food were prepared according to the following formulations.

TABLE 21

| Formulation of Flavor Composition (K-1) | |
| --- | --- |
| (Component) | (Parts by weight) |
| (±)-Mustakone | 0.005 |
| Citral | 3.0 |
| α-Terpineol | 1.0 |
| Geraniol | 0.5 |
| Geranyl acetate | 0.5 |
| Neryl acetate | 0.5 |
| Ethanol | Balance |
| Total | 1,000.0 |

TABLE 22

| Formulation of Flavor Composition (K-2) | |
| --- | --- |
| (Component) | (Parts by weight) |
| (−)-Mustakone | 0.005 |
| Citral | 3.0 |
| α-Terpineol | 1.0 |

TABLE 22-continued

Formulation of Flavor Composition (K-2)

| (Component) | (Parts by weight) |
|---|---|
| Geraniol | 0.5 |
| Geranyl acetate | 0.5 |
| Neryl acetate | 0.5 |
| Ethanol | Balance |
| Total | 1,000.0 |

TABLE 23

Formulation of Flavor Composition (K-3)

| (Component) | (Parts by weight) |
|---|---|
| (+)-Mustakone | 0.005 |
| Citral | 3.0 |
| α-Terpineol | 1.0 |
| Geraniol | 0.5 |
| Geranyl acetate | 0.5 |
| Neryl acetate | 0.5 |
| Ethanol | Balance |
| Total | 1,000.0 |

Comparative Example 6

As Comparative Example 6, a flavor composition (L) for lemon food was prepared according to the following formulation.

TABLE 24

Formulation of Flavor Composition (L)

| (Component) | (Parts by weight) |
|---|---|
| Citral | 3.0 |
| α-Terpineol | 1.0 |
| Geraniol | 0.5 |
| Geranyl acetate | 0.5 |
| Neryl acetate | 0.5 |
| Ethanol | Balance |
| Total | 1,000.0 |

Comparison Test Example 6

0.1% by weight of each of the flavor compositions (K-1), (K-2), (K-3), and (L) for lemon food obtained in Example 15 and Comparative Example 6 was added to water, and an organoleptic test by five expert panelists was performed. As a result, all the members pointed out that the waters having the flavor compositions (K-1), (K-2), and (K-3) of Example 15, respectively added thereto were imparted with a natural and profound juicy sensation which was not felt in the water having the flavor composition (L) of Comparative Example 6, and were remarkably excellent.

Example 16

Addition to Commercial Apple Fruit Juice Drink 0.5 ppb of (±)-mustakone was added to a commercial apple fruit juice drink, and an organoleptic test by five expert panelists was performed. As a result, all the members pointed out that by adding (±)-mustakone, the resultant was imparted with a natural juicy sensation accompanied with a hard flesh impression and was remarkably excellent.

Example 17

Addition to Commercial Apple Fruit Juice Drink 0.5 ppb of (−)-mustakone was added to a commercial apple fruit juice drink, and an organoleptic test by five expert panelists was performed. As a result, all the members pointed out that by adding (−)-mustakone, the resultant was imparted with a natural juicy sensation accompanied with a hard flesh impression and was remarkably excellent.

Example 18

Addition to Commercial Apple Fruit Juice Drink 0.5 ppb of (+)-mustakone was added to a commercial apple fruit juice drink, and an organoleptic test by five expert panelists was performed. As a result, all the members pointed out that by adding (+)-mustakone, the resultant was imparted with a natural juicy sensation accompanied with a hard flesh impression and was remarkably excellent.

Example 19

Flavor Composition for Apple Food

Flavor compositions (M-1), (M-2), and (M-3) for apple food were prepared according to the following formulations.

TABLE 25

Formulation of Flavor Composition (M-1)

| (Component) | (Parts by weight) |
|---|---|
| (±)-Mustakone | 0.0005 |
| 2-Methylbutyl acetate | 16.0 |
| Hexanol | 12.0 |
| trans-2-Hexenal | 1.5 |
| Isoamyl alcohol | 10.0 |
| Hexanal | 3.0 |
| Hexyl acetate | 6.0 |
| Butyl acetate | 12.0 |
| Ethyl butyrate | 3.0 |
| Ethyl 2-methylbutyrate | 2.0 |
| Acetic acid | 4.0 |
| Damascenone | 0.005 |
| Ethanol | Balance |
| Total | 1,000.0 |

TABLE 26

Formulation of Flavor Composition (M-2)

| (Component) | (Parts by weight) |
|---|---|
| (−)-Mustakone | 0.0005 |
| 2-Methylbutyl acetate | 16.0 |
| Hexanol | 12.0 |
| trans-2-Hexenal | 1.5 |
| Isoamyl alcohol | 10.0 |
| Hexanal | 3.0 |
| Hexyl acetate | 6.0 |
| Butyl acetate | 12.0 |
| Ethyl butyrate | 3.0 |
| Ethyl 2-methylbutyrate | 2.0 |

TABLE 26-continued

Formulation of Flavor Composition (M-2)

| (Component) | (Parts by weight) |
|---|---|
| Acetic acid | 4.0 |
| Damascenone | 0.005 |
| Ethanol | Balance |
| Total | 1,000.0 |

TABLE 27

Formulation of Flavor Composition (M-3)

| (Component) | (Parts by weight) |
|---|---|
| (+)-Mustakone | 0.0005 |
| 2-Methylbutyl acetate | 16.0 |
| Hexanol | 12.0 |
| trans-2-Hexenal | 1.5 |
| Isoamyl alcohol | 10.0 |
| Hexanal | 3.0 |
| Hexyl acetate | 6.0 |
| Butyl acetate | 12.0 |
| Ethyl butyrate | 3.0 |
| Ethyl 2-methylbutyrate | 2.0 |
| Acetic acid | 4.0 |
| Damascenone | 0.005 |
| Ethanol | Balance |
| Total | 1,000.0 |

Comparative Example 7

As Comparative Example 7, a flavor composition (N) for apple food was prepared according to the following formulation.

TABLE 28

Formulation of Flavor Composition (N)

| (Component) | (Parts by weight) |
|---|---|
| 2-Methylbutyl acetate | 16.0 |
| Hexanol | 12.0 |
| trans-2-Hexenal | 1.5 |
| Isoamyl alcohol | 10.0 |
| Hexanal | 3.0 |
| Hexyl acetate | 6.0 |
| Butyl acetate | 12.0 |
| Ethyl butyrate | 3.0 |
| Ethyl 2-methylbutyrate | 2.0 |
| Acetic acid | 4.0 |
| Damascenone | 0.005 |
| Ethanol | Balance |
| Total | 1,000.0 |

Comparison Test Example 7

0.1% by weight of each of the flavor compositions (M-1), (M-2), (M-3), and (N) for apple food obtained in Example 19 and Comparative Example 7 was added to water, and an organoleptic test by five expert panelists was performed. As a result, all the members pointed out that the waters having the flavor compositions (M-1), (M-2), and (M-3) of Example 19, respectively added thereto were imparted with a natural fleshy sensation accompanied with a hard flesh impression and were remarkably excellent as compared with the water having the flavor composition (N) of Comparative Example 7 added thereto.

Example 20

Addition to Commercial Grape Fruit Juice Drink 1 ppb of (±)-mustakone was added to a commercial grape fruit juice drink, and an organoleptic test by five expert panelists was performed. As a result, all the members pointed out that by adding (±)-mustakone, the resultant was imparted with a thick and natural juicy sensation and was remarkably excellent.

Example 21

Addition to Commercial Grape Fruit Juice Drink 1 ppb of (−)-mustakone was added to a commercial grape fruit juice drink, and an organoleptic test by five expert panelists was performed. As a result, all the members pointed out that by adding (−)-mustakone, the resultant was imparted with a thick and natural juicy sensation and was remarkably excellent.

Example 22

Addition to Commercial Grape Fruit Juice Drink 1 ppb of (+)-mustakone was added to a commercial grape fruit juice drink, and an organoleptic test by five expert panelists was performed. As a result, all the members pointed out that by adding (+)-mustakone, the resultant was imparted with a thick and natural juicy sensation and was remarkably excellent.

Example 23

Flavor compositions (O-1), (O-2), and (O-3) for grape food were prepared according to the following formulations.

TABLE 29

Formulation of Flavor Composition (O-1)

| (Component) | (Parts by weight) |
|---|---|
| (±)-Mustakone | 0.001 |
| Ethyl acetate | 30.0 |
| Ethyl butyrate | 20.0 |
| cis-3-Hexenol | 8.0 |
| Methyl anthranilate | 15.0 |
| Ethyl maltol | 20.0 |
| Propionic acid | 15.0 |
| Hexanoic acid | 1.5 |
| trans-2-Hexenal | 2.0 |
| Propyl acetate | 25.0 |
| Ethyl propionate | 30.0 |
| Linalool | 0.3 |
| Cinnamic alcohol | 0.3 |
| Damascenone | 0.002 |
| Ethanol | Balance |
| Total | 1,000.0 |

TABLE 30

Formulation of Flavor Composition (O-2)

| (Component) | (Parts by weight) |
|---|---|
| (−)-Mustakone | 0.001 |
| Ethyl acetate | 30.0 |
| Ethyl butyrate | 20.0 |
| cis-3-Hexenol | 8.0 |
| Methyl anthranilate | 15.0 |
| Ethyl maltol | 20.0 |
| Propionic acid | 15.0 |
| Hexanoic acid | 1.5 |
| trans-2-Hexenal | 2.0 |
| Propyl acetate | 25.0 |
| Ethyl propionate | 30.0 |
| Linalool | 0.3 |
| Cinnamic alcohol | 0.3 |
| Damascenone | 0.002 |
| Ethanol | Balance |
| Total | 1,000.0 |

TABLE 31

Formulation of Flavor Composition (O-3)

| (Component) | (Parts by weight) |
|---|---|
| (+)-Mustakone | 0.001 |
| Ethyl acetate | 30.0 |
| Ethyl butyrate | 20.0 |
| cis-3-Hexenol | 8.0 |
| Methyl anthranilate | 15.0 |
| Ethyl maltol | 20.0 |
| Propionic acid | 15.0 |
| Hexanoic acid | 1.5 |
| trans-2-Hexenal | 2.0 |
| Propyl acetate | 25.0 |
| Ethyl propionate | 30.0 |
| Linalool | 0.3 |
| Cinnamic alcohol | 0.3 |
| Damascenone | 0.002 |
| Ethanol | Balance |
| Total | 1,000.0 |

Comparative Example 8

As Comparative Example 8, a flavor composition (P) for grape food was prepared according to the following formulation.

TABLE 32

Formulation of Flavor Composition (P)

| (Component) | (Parts by weight) |
|---|---|
| Ethyl acetate | 30.0 |
| Ethyl butyrate | 20.0 |
| cis-3-Hexenol | 8.0 |
| Methyl anthranilate | 15.0 |
| Ethyl maltol | 20.0 |
| Propionic acid | 15.0 |
| Hexanoic acid | 1.5 |
| trans-2-Hexenal | 2.0 |
| Propyl acetate | 25.0 |
| Ethyl propionate | 30.0 |
| Linalool | 0.3 |
| Cinnamic alcohol | 0.3 |
| Damascenone | 0.002 |
| Ethanol | Balance |
| Total | 1,000.0 |

Comparison Test Example 8

0.1% by weight of each of the flavor compositions (O-1), (O-2), (O-3), and (P) for grape food obtained in Example 23 and Comparative Example 8 was added to water, and an organoleptic test by five expert panelists was performed. As a result, all the members pointed out that the waters having the flavor compositions (O-1), (O-2), and (O-3) of Example 23, respectively added thereto were imparted with a thick and natural fleshy sensation and were remarkably excellent as compared with the water having the flavor composition (P) of Comparative Example 8 added thereto.

Example 24

Addition to Commercial Peach Fruit Juice Drink 1 ppb of (±)-mustakone was added to a commercial peach fruit juice drink, and an organoleptic test by five expert panelists was performed. As a result, all the members pointed out that by adding (±)-mustakone, the resultant was imparted with a natural fleshy sensation accompanied with a fibrous image and was remarkably excellent.

Example 25

Addition to Commercial Peach Fruit Juice Drink 1 ppb of (−)-mustakone was added to a commercial peach fruit juice drink, and an organoleptic test by five expert panelists was performed. As a result, all the members pointed out that by adding (−)-mustakone, the resultant was imparted with a natural fleshy sensation accompanied with a fibrous image and was remarkably excellent.

Example 26

Addition to Commercial Peach Fruit Juice Drink 1 ppb of (+)-mustakone was added to a commercial peach fruit juice drink, and an organoleptic test by five expert panelists was performed. As a result, all the members pointed out that by adding (+)-mustakone, the resultant was imparted with a natural fleshy sensation accompanied with a fibrous image and was remarkably excellent.

Example 27

Flavor compositions (Q-1), (Q-2), and (Q-3) for peach food were prepared according to the following formulations.

TABLE 33

Formulation of Flavor Composition (Q-1)

| (Component) | (Parts by weight) |
|---|---|
| (±)-Mustakone | 0.001 |
| Ethyl acetate | 50.0 |
| Hexanol | 1.0 |

TABLE 33-continued

Formulation of Flavor Composition (Q-1)

| (Component) | (Parts by weight) |
| --- | --- |
| Benzaldehyde | 0.4 |
| Maltol | 2.0 |
| Hexanal | 0.2 |
| Hexyl acetate | 3.0 |
| γ-Undecalactone | 0.3 |
| Ethyl octanoate | 0.05 |
| β-Ionone | 0.002 |
| Linalool | 0.2 |
| Isoamyl acetate | 8.0 |
| Ethyl butyrate | 3.0 |
| Ethanol | Balance |
| Total | 1,000.0 |

TABLE 34

Formulation of Flavor Composition (Q-2)

| (Component) | (Parts by weight) |
| --- | --- |
| (−)-Mustakone | 0.001 |
| Ethyl acetate | 50.0 |
| Hexanol | 1.0 |
| Benzaldehyde | 0.4 |
| Maltol | 2.0 |
| Hexanal | 0.2 |
| Hexyl acetate | 3.0 |
| γ-Undecalactone | 0.3 |
| Ethyl octanoate | 0.05 |
| β-Ionone | 0.002 |
| Linalool | 0.2 |
| Isoamyl acetate | 8.0 |
| Ethyl butyrate | 3.0 |
| Ethanol | Balance |
| Total | 1,000.0 |

TABLE 35

Formulation of Flavor Composition (Q-3)

| (Component) | (Parts by weight) |
| --- | --- |
| (+)-Mustakone | 0.001 |
| Ethyl acetate | 50.0 |
| Hexanol | 1.0 |
| Benzaldehyde | 0.4 |
| Maltol | 2.0 |
| Hexanal | 0.2 |
| Hexyl acetate | 3.0 |
| γ-Undecalactone | 0.3 |
| Ethyl octanoate | 0.05 |
| β-Ionone | 0.002 |
| Linalool | 0.2 |
| Isoamyl acetate | 8.0 |
| Ethyl butyrate | 3.0 |
| Ethanol | Balance |
| Total | 1,000.0 |

Comparative Example 9

As Comparative Example 9, a flavor composition (R) for peach food was prepared according to the following formulation.

TABLE 36

Formulation of Flavor Composition (R)

| (Component) | (Parts by weight) |
| --- | --- |
| Ethyl acetate | 50.0 |
| Hexanol | 1.0 |
| Benzaldehyde | 0.4 |
| Maltol | 2.0 |
| Hexanal | 0.2 |
| Hexyl acetate | 3.0 |
| γ-Undecalactone | 0.3 |
| Ethyl octanoate | 0.05 |
| β-Ionone | 0.002 |
| Linalool | 0.2 |
| Isoamyl acetate | 8.0 |
| Ethyl butyrate | 3.0 |
| Ethanol | Balance |
| Total | 1,000.0 |

Comparison Test Example 9

0.1% by weight of each of the flavor compositions (Q-1), (Q-2), (Q-3), and (R) for peach food obtained in Example 27 and Comparative Example 9 was added to water, and an organoleptic test by five expert panelists was performed. As a result, all the members pointed out that the waters having the flavor compositions (Q-1), (Q-2), and (Q-3) of Example 27, respectively added thereto were imparted with a natural fleshy sensation accompanied with a fibrous image and were remarkably excellent as compared with the water having the flavor composition (R) of Comparative Example 9 added thereto.

Example 28

Addition to Commercial Wine Taste Drink 1 ppb of (±)-mustakone was added to a commercial wine taste drink, and an organoleptic test by five expert panelists was performed. As a result, all the members pointed out that by adding (±)-mustakone, the resultant was enhanced in a natural oak barrel flavor and a ripened sensation and was remarkably excellent.

Example 29

Addition to Commercial Wine Taste Drink 1 ppb of (−)-mustakone was added to a commercial wine taste drink, and an organoleptic test by five expert panelists was performed. As a result, all the members pointed out that by adding (−)-mustakone, the resultant was enhanced in a natural oak barrel flavor and a ripened sensation and was remarkably excellent.

Example 30

Addition to Commercial Wine Taste Drink 1 ppb of (+)-mustakone was added to a commercial wine taste drink, and an organoleptic test by five expert panelists was performed. As a result, all the members pointed out that by adding (+)-mustakone, the resultant was enhanced in a natural oak barrel flavor and a ripened sensation and was remarkably excellent.

Example 31

Flavor compositions (S-1), (S-2), and (S-3) for wine food were prepared according to the following formulations.

TABLE 37

| Formulation of Flavor Composition (S-1) | |
|---|---|
| (Component) | (Parts by weight) |
| (±)-Mustakone | 0.001 |
| Isoamyl acetate | 3.0 |
| Ethyl hexanoate | 1.0 |
| Ethyl octanoate | 0.2 |
| Ethyl decanoate | 0.6 |
| 2-Phenylethyl alcohol | 1.0 |
| Octanoic acid | 1.0 |
| Decanoic acid | 0.8 |
| Damascenone | 0.005 |
| Ethyl 2-methylbutyrate | 0.05 |
| Ethyl butyrate | 0.3 |
| Geraniol | 0.02 |
| Linalool | 0.03 |
| 2-Phenylethyl acetate | 0.5 |
| Ethyl acetate | 35.0 |
| Isoamyl alcohol | 40.0 |
| Dimethyl sulfide | 0.03 |
| Ethanol | Balance |
| Total | 1,000.0 |

TABLE 38

| Formulation of Flavor Composition (S-2) | |
|---|---|
| (Component) | (Parts by weight) |
| (−)-Mustakone | 0.001 |
| Isoamyl acetate | 3.0 |
| Ethyl hexanoate | 1.0 |
| Ethyl octanoate | 0.2 |
| Ethyl decanoate | 0.6 |
| 2-Phenylethyl alcohol | 1.0 |
| Octanoic acid | 1.0 |
| Decanoic acid | 0.8 |
| Damascenone | 0.005 |
| Ethyl 2-methylbutyrate | 0.05 |
| Ethyl butyrate | 0.3 |
| Geraniol | 0.02 |
| Linalool | 0.03 |
| 2-Phenylethyl acetate | 0.5 |
| Ethyl acetate | 35.0 |
| Isoamyl alcohol | 40.0 |
| Dimethyl sulfide | 0.03 |
| Ethanol | Balance |
| Total | 1,000.0 |

TABLE 39

| Formulation of Flavor Composition (S-3) | |
|---|---|
| (Component) | (Parts by weight) |
| (+)-Mustakone | 0.001 |
| Isoamyl acetate | 3.0 |
| Ethyl hexanoate | 1.0 |
| Ethyl octanoate | 0.2 |
| Ethyl decanoate | 0.6 |
| 2-Phenylethyl alcohol | 1.0 |
| Octanoic acid | 1.0 |
| Decanoic acid | 0.8 |
| Damascenone | 0.005 |
| Ethyl 2-methylbutyrate | 0.05 |
| Ethyl butyrate | 0.3 |
| Geraniol | 0.02 |
| Linalool | 0.03 |
| 2-Phenylethyl acetate | 0.5 |
| Ethyl acetate | 35.0 |
| Isoamyl alcohol | 40.0 |
| Dimethyl sulfide | 0.03 |
| Ethanol | Balance |
| Total | 1,000.0 |

Comparative Example 10

As Comparative Example 10, a flavor composition (T) for wine food was prepared according to the following formulation.

TABLE 40

| Formulation of Flavor Composition (T) | |
|---|---|
| (Component) | (Parts by weight) |
| Isoamyl acetate | 3.0 |
| Ethyl hexanoate | 1.0 |
| Ethyl octanoate | 0.2 |
| Ethyl decanoate | 0.6 |
| 2-Phenylethyl alcohol | 1.0 |
| Octanoic acid | 1.0 |
| Decanoic acid | 0.8 |
| Damascenone | 0.005 |
| Ethyl 2-methylbutyrate | 0.05 |
| Ethyl butyrate | 0.3 |
| Geraniol | 0.02 |
| Linalool | 0.03 |
| 2-Phenylethyl acetate | 0.5 |
| Ethyl acetate | 35.0 |
| Isoamyl alcohol | 40.0 |
| Dimethyl sulfide | 0.03 |
| Ethanol | Balance |
| Total | 1,000.0 |

Comparison Test Example 10

0.1% by weight of each of the flavor compositions (S-1), (S-2), (S-3), and (T) for wine food obtained in Example 31 and Comparative Example 10 was added to water, and an organoleptic test by five expert panelists was performed. As a result, all the members pointed out that the waters having the flavor compositions (S-1), (S-2), and (S-3) of Example 31, respectively added thereto were enhanced in a natural oak barrel flavor and a ripened sensation and were remarkably excellent as compared with the water having the flavor composition (T) of Comparative Example 10 added thereto.

While the present invention has been described in detail and with reference to specific embodiments thereof, it will be apparent to one skilled in the art that various changes and modifications can be made therein without departing from the spirit and scope of the present invention. The present application is based on a Japanese patent application No. 2016-162071 filed on Aug. 22, 2016), the entireties of which are incorporated by reference.

INDUSTRIAL APPLICABILITY

By adding the flavor composition of the present invention or at least one selected from the group consisting of (−)- mustakone, (+)-mustakone, and a mixture thereof, a fleshy sensation or a juicy sensation, or a flavor of ripened sensation of a food or drink can be imparted or enhanced.

The invention claimed is:

1. A flavor composition to be added to a food or drink, the composition containing at least one selected from the group consisting of (−)-mustakone, (+)-mustakone, and a mixture thereof, in an amount of 0.001 to 100 ppm on a basis of the weight of the flavor composition.

2. The flavor composition according to claim 1, wherein the food or drink is a drink.

3. The flavor composition according to claim 2, wherein the drink is a citrus drink including a citrus.

4. The flavor composition according to claim 3, wherein the citrus is at least one selected from the group consisting of grapefruit, orange, and lemon.

5. A food or drink including the flavor composition according to claim 1.

6. A method for producing a flavored food or drink, comprising adding the flavor composition according to claim 1 to a food or drink.

7. A food or drink containing at least one selected from (−)-mustakone, (+)-mustakone, and a mixture thereof, in an amount of 0.001 to 100 ppb relative to the weight of the food or drink.

8. The food or drink according to claim 7, wherein the food or drink is a citrus-like food or drink.

9. A method for producing a flavored food or drink, comprising adding at least one selected from (−)-mustakone, (+)-mustakone, and a mixture thereof to a food or drink, in an amount of 0.001 to 100 ppb relative to the weight of the food or drink.

10. The method for producing a food or drink according to claim 9, wherein the food or drink is a citrus-like food or drink.

* * * * *